ary Examiner—Samuel Scott
Assistant Examiner—A. Russell Burke

United States Patent [19]
Beaudoin et al.

[11] 3,962,928
[45] June 15, 1976

[54] VARIABLE DIAMETER PULLEY WITH SHIM MEANS COMPENSATING FOR BELT WEAR

[76] Inventors: Guy Beaudoin, 1238 Chabanel St., Drummondville South, Quebec; Marcel Vincent, 320 Hebert St., Wickham, Quebec, both of Canada

[22] Filed: Jan. 14, 1975

[21] Appl. No.: 541,074

[52] U.S. Cl................... 74/230.17 B; 74/230.17 E
[51] Int. Cl.²........................................ F16H 55/52
[58] Field of Search ............ 74/230.17 E, 230.17 R, 74/230.17 A, 230.17 B, 230.17 M, 217 CV, 336

[56] References Cited
UNITED STATES PATENTS
3,768,323   10/1973   Houle........................... 74/230.17 E Primary Examiner—Samuel Scott
Assistant Examiner—A. Russell Burke

[57] ABSTRACT

A variable diameter pulley including a pair of pulley flanges axially displaceable one relative to the other, centrifugally responsive weights acting on one flange to cause axial displacement thereof, a pusher ring interposed between the actuating weights and the axially displaceable flange, a drive device transmitting the rotation to the weights and the axially displaceable pulley flange. This variable diameter pulley is characterized by providing an axial stop to produce a minimum clearance between the pulley flanges and removable shims to adjust the spacing between the pulley flanges in relation to the wear of a belt engaged in this spacing.

1 Claim, 4 Drawing Figures

VARIABLE DIAMETER PULLEY WITH SHIM MEANS COMPENSATING FOR BELT WEAR

This invention relates to a pulley of the type having a pair of pulley flanges adapted to be axially moved toward and away one from the other to vary the effective engagement of a belt therewith. A pulley of this type finds particular application in a snowmobile.

The anteriorly proposed pulleys of the above type reveal that other desiderata concerning the operation of such pulleys have not been met and that further functional and structural advantages may be imparted to such pulley. In particular, the heretofore proposed pulleys of the above type include pulley flanges which are provided with a definite range of axial displacement relative to each other. This range includes contacting engagement of the two pulley flanges and resultant operational disadvantages. Besides, this definite range of relative axial displacement fails to take into account the wear of the belt.

It is a general object of the present invention to provide a variable diameter pulley of the above type, wherein the two pulley flanges are not allowed to come in engagement with each other and wherein the wear of the associated belt is compensated to extend the useful life of otherwise serviceable belts.

It is a more specific object of the present invention to provide a variable diameter pulley of the above type to provide shims to limit the axial displacement of the displaceable pulley flange toward the fixed pulley flange and wherein said shims are readily removable to allow closer spacing relationship between the flanges in relation with the wear of the associated belt.

The above and other objects and advantages of the present invention will be better understood by the following description of a preferred embodiment thereof which is illustrated, by way of example, in the accompanying drawings, wherein.

Figure 1:
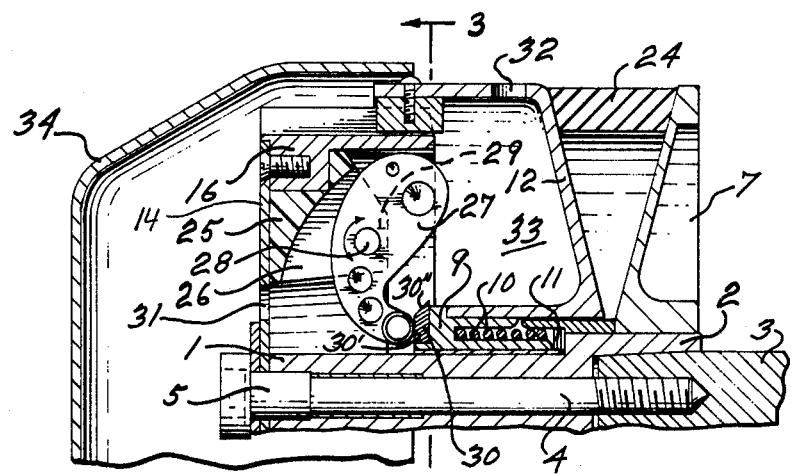
FIG. 1 is an axial cross-sectional view through a variable diameter pulley shown in fully actuated position according to the present invention.

The illustrated variable diameter pulley includes a shaft 1 having an axially bored end 2 engaging on the end of a driving shaft 3. The pulley shaft 2 is fixed to the driving shaft 3 by a bolt 4 extending through a bushing 5. The axially bored end 2 is of larger diameter than the remainder of the pulley shaft and forms an annular shoulder 6 constituting of axial abutment or stop, the function of which will be better defined later. The axial stop 6 is positioned on the pulley shaft 2 at a predetermined axial position relative to the pulley flanges.

A pulley flange 7 is rigidly fixed on the bored end 2 for rotation with the pulley shaft 1 and in axially fixed position relative to the latter. A sleeve 8 is also rigidly fixed on the bored end 2 and projects axially away from the pulley flange 7. Another sleeve 9 is rotatably and slidably mounted on the pulley shaft 1. The sleeves 8 and 9 cooperatively form an annular space with each other in which is contained a compression spring 10. Shims 11 are positioned against the annular shoulder or stop 6 with the spring 10 in abutment therewith. As seen in FIG. 1, the shims 11, in cooperation with the axial stop 6, limit the axial displacement of the sleeve 9 relative to the fixed pulley flange 7, and upon removal produce a minimum clearance between the axially displaceable pulley flange 12 and the fixed flange 7. The pulley flange 12 is fixed to the sleeve 9 for bodily axial and rotational displacement therewith. The axially displaceable flange 12 is formed with a cylindrical skirt portion 13 at the periphery thereof.

A circular drive plate 14 is clamped against the end of the pulley shaft 1 by the bolt 4 and the washer 15. A sleeve 16 is secured peripherally to the drive plate 14 by screws 17, or other suitable expedient, and projects toward the pulley flanges 7 and 12. Thus, the cylindrical skirt portion 13 circumscribes the sleeve 16 in radially spaced-apart relationship. The sleeve 16 is formed with ridges 18 and 19 against the external cylindrical surface thereof. These ridges 18 and 19 project longitudinally of the axis of the pulley. In particular, the ridges 18 extend parallel to the axis of the pulley and thus form similarly projecting grooves or guideways 20. The ridges 19, instead, extend at an angle to the axis of the pulley and form similarly projecting grooves or guideways 21. Thus, the grooves 21 extend at an angle or diagonally relative to the grooves 20 and alternate with the latter. A follower block or pad 22 is selectively engaged in each groove 20 or 21. It must be noted that the blocks 22 are pivotally mounted against the inner face of the cylindrical skirt 13, by rivets 23, to thereby allow selective engagement in the grooves 20 or 21.

The drive plate 14 and sleeve 16 thus drive the pulley flange 12 at the periphery thereof and the required clearances of the blocks 22 in the grooves produce less vibration and noise than the conventional splined drive, since the same clearances are farther from the rotation axis and thence reduce the possible angular play. Preferably, the blocks or pads 22 are made of nylon, plastic, rubber or the like, which further enhances the reduction of noise.

When the blocks 22 are selectively engaged in the diagonal grooves 21, the angle of the latter being appropriately chosen relative to the direction of rotation, upon starting the rotation, the diagonal grooves 21 induce a recessive axial action on the blocks 22 and, consequently, on the axially displaceable flange 12. Consequently, there results a delayed and, thereafter, more energetic drive of the belt 24.

A carrier 25, made of a block of plastic or the like, is mounted against the circular plate 14 inside the sleeve 16. This carrier 25 is in frictionally rotative engagement with the face of the circular plate 14, such as to be driven by the latter but after some angular shifting of the carrier relative to the circular plate. The carrier 25 is formed with four radial slots 26, each having a centrifugally responsive weight or lever 27 pivoted therein by a pin 28 engaged in a corresponding open notch 29. The weights 27 may thus be readily inserted in the notches 29 which are axially projecting relative to the axis of the pulley.

A pusher ring 30, of wear-resistant material, is removably engaged on the sleeve 9 for rotation therewith. The pusher ring 30 has opposite sides or faces made with dissimilar radial contours; in this case, a completely straight line contour on one face and a broken line contour on the other face defining inner face 30' and outer bevelled face 30" respectively. The pusher ring 30 is engaged by the weights 27, the pivotal movement of which produces the axial displacement of the ring and the displaceable flange 12.

As aforementioned, the carrier 25 is angularly shifted due to inertia relative to the drive plate 14 and, consequently, also relative to the pusher ring 30. Thus, the points of contact of the weights 27 with the ring 30 are similarly angularly varied, resulting in more even wear of the pusher ring 30 and longer life of the latter.

Figure 2:
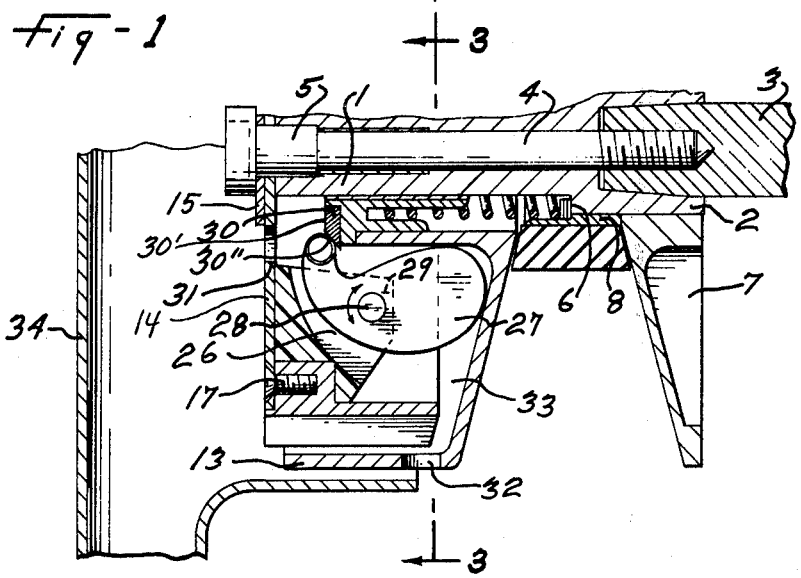
FIG. 2 is a view as in FIG. 1 but with the pulley fully deactuated or in the idle position.
Figure 3:
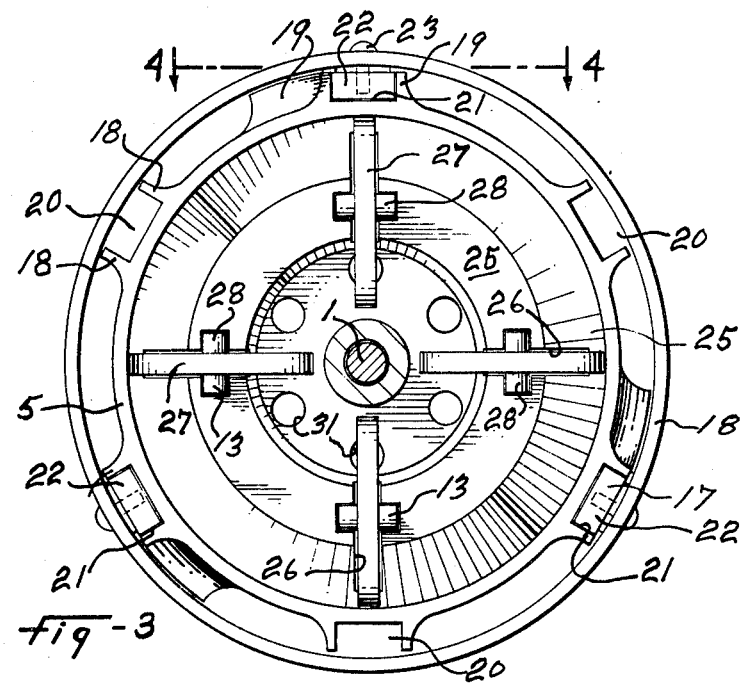
FIG. 3 is a cross-sectional view as seen along line 3—3 in FIG. 1.
Figure 4:
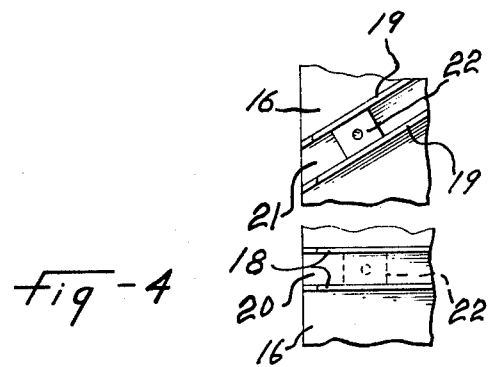
FIG. 4 is a developed plan view of portions of the drive device for the displaceable pulley flange.

The pusher ring 30 may be reversed to selectively present one of the two radially contoured faces to the weights 27. For normal operation, the completely flat face is presented. When the opposite face is presented, as shown in the drawings, the inner end of weights 27 engages bevelled face 30'' in the rest position of the pulley, as shown in FIG. 2. With increase in pulley speed, the inner end of weights 27 has to move up the bevelled face 30'' to engage the perpendicular face portion 30'; thus, clutching takes place at a higher speed than normally. In the fully closed position of the pulley flanges, as shown in FIG. 1, the weight inner end still engages perpendicular face portion 30'. The angle of bevelled face portion 30'' may vary between about ½° and 90° with respect to face portion 30'. The greater the angle, the higher will be the speed at which clutching takes place. The rate of axial response of the displaceable pulley flange 12 may thus be present according to the need.

The circular plate 14 is provided with air inlet ports or apertures 31, while the skirt 13 of the displaceable flange is provided with air outlet ports or apertures 32 arranged radially outwardly of the inlet ports 31. The drive device formed of the drive plate 14, the sleeve 16 and the carrier 25 forms an annular space 33 with the displaceable flange 12. This arrangement causes the flat weights 27 to act as vanes producing radially outward ventilation by air intake through the inlet ports 31, air flow in the annular space 33, and air exit through the outlet ports 32. This air flow cools the pulley itself and, in a snowmobile, is taken from outside the engine hood by a duct 34 and is circulated inside this hood to cool the engine and other driven parts. This is important, since it permits to close the hood to reduce noise while allowing proper cooling of the engine.

The shims 11 may be removed in relation to the wear of the belt 24, such that the pulley retains the same performance characteristics during the life of the belt.

We claim:

1. A belt wear compensating variable diameter pulley comprising shaft means, a first and a second pulley flanges coaxially mounted on said shaft means, said first pulley flange being axially displaceable along said shaft means toward and away from said second pulley flange, an axial stop provided on said shaft means engageable by said first pulley flange and positioned along said shaft means at a predetermined axial position relative to the pulley flanges and producing a minimum clearance between the latter upon axial engagement by said first pulley flange, and shims removably interposed between said axial stop and said first pulley flange and selectively removable to reduce the spacing between the pulley flanges in relation to the wear of a belt engaging in said spacing.

* * * * *